United States Patent [19]

Höhle

[11] Patent Number: 5,435,911
[45] Date of Patent: Jul. 25, 1995

[54] BACK-WASHABLE FILTER ELEMENT COMPRISED OF PERFORATED TUBES

[75] Inventor: Glenn Höhle, Männedorf, Switzerland

[73] Assignee: DrM Dr. Mueller AG, Maennedorf, Switzerland

[21] Appl. No.: 50,456

[22] PCT Filed: Sep. 7, 1992

[86] PCT No.: PCT/CH92/00181
§ 371 Date: May 13, 1993
§ 102(e) Date: May 13, 1993

[87] PCT Pub. No.: WO93/05860
PCT Pub. Date: Apr. 1, 1993

[51] Int. Cl.⁶ .................................. B01D 29/66
[52] U.S. Cl. .................. 210/136; 138/111; 210/323.2; 210/333.01; 210/438; 55/350.1
[58] Field of Search .......... 210/108, 117, 136, 323.2, 210/333.01, 340, 411, 437, 438, 439, 456; 55/350; 138/111, 115

[56] References Cited

U.S. PATENT DOCUMENTS

| | | | |
|---|---|---|---|
| 1,329,171 | 1/1920 | Garry et al. | 210/117 |
| 3,382,978 | 5/1968 | Rosean | 210/130 |
| 4,041,592 | 8/1977 | Kelm | 138/115 |
| 4,473,472 | 9/1984 | Muller | 210/458 |
| 4,695,375 | 9/1987 | Tyler | 210/117 |
| 4,752,403 | 6/1988 | Allred | 210/333.01 |
| 4,832,841 | 5/1989 | Gutman | 210/323.2 |
| 4,919,801 | 4/1990 | Hobson | 210/323.2 |
| 4,973,404 | 11/1990 | Weber et al. | 210/193 |
| 5,128,038 | 7/1992 | Slavitscheck et al. | 210/323.2 |
| 5,133,858 | 7/1992 | Walz et al. | 210/136 |
| 5,135,665 | 8/1992 | Birkenstock et al. | 210/323.2 |

FOREIGN PATENT DOCUMENTS

| | | | |
|---|---|---|---|
| 0066921 | 12/1982 | European Pat. Off. | 210/323.2 |
| 2006685 | 9/1970 | Germany | 210/333.01 |

*Primary Examiner*—Joseph W. Drodge
*Attorney, Agent, or Firm*—Michael J. Striker

[57] ABSTRACT

A back-washable, candle filter element has a center tube with a closed peripheral wall surrounded by a plurality of perforated tubes. A head part has bores and a seat and receives a pressure control arrangement located between the bores. The bores establish a direct link between the top openings of the perforated tubes and the central tube for increasing a filtration power in a controlled manner, and for back-washing and drying a filter cake in a controlled manner.

7 Claims, 2 Drawing Sheets

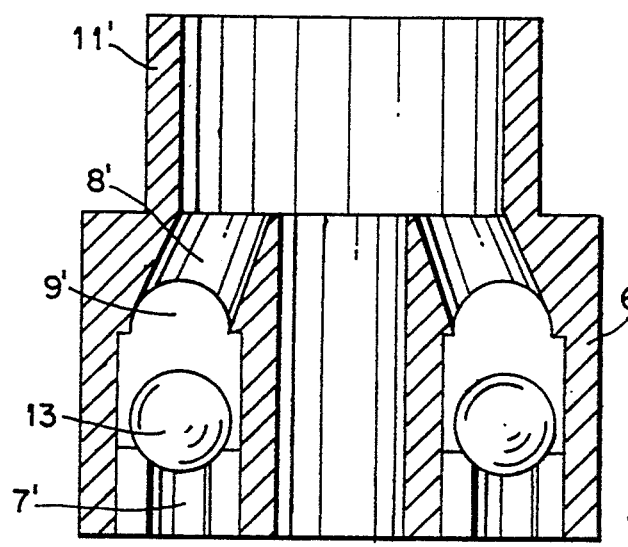
FIG. 2
FIG. 3
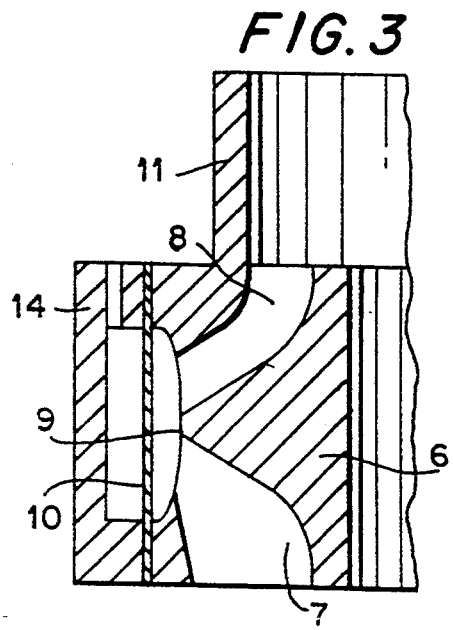
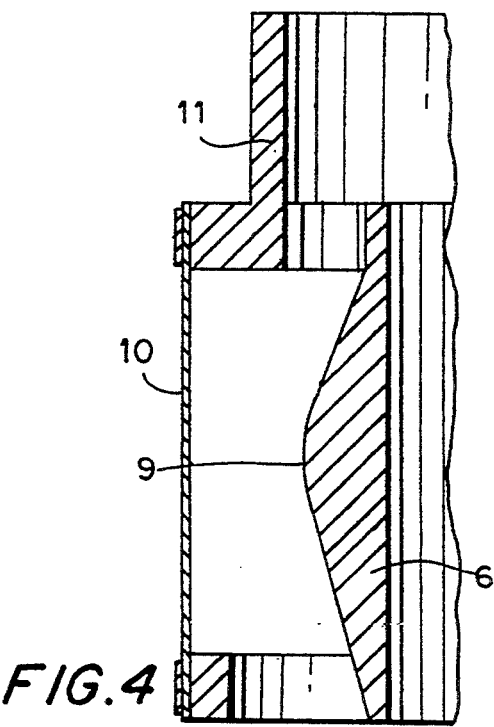
FIG. 4

BACK-WASHABLE FILTER ELEMENT COMPRISED OF PERFORATED TUBES

BACKGROUND OF THE INVENTION

The invention concerns a back-washable filter element which is to be installed in a pressure vessel and has a supporting body of perforated tubes, a central tube, and a head part.

A filter element of this type is known from U.S. Pat. No. 4,473,472. The known filter element which is suitable for residual volume filtration includes a central tube which is closed along its entire length. A filtrate is removed through the central tube and when the filtration is concluded a backwashing agent is fed in opposite the filtration direction for cleaning the filter medium. The central tube is surrounded by perforated tubes to support the filter medium, generally a woven fabric. In the known filter element the filtrate can only be removed via the lower opening of the central tube. This is disadvantageous in that the capacity of the filter is greatly limited by the restricted lumen of the central tube, as is the speed and efficiency of the backwashing.

SUMMARY OF THE INVENTION

The object of the invention is to increase the performance of a filter element of this type and simultaneously to enable a drying and dry discharging of a filter cake.

This object is met according to the invention in that the head part of the filter element is provided with at least one bore hole facing the upper openings of the tubes and an additional bore hole and a seat for receiving a pressure control device.

The central tube is advisably connected with the openings of the tubes serving as supporting tubes via one or more bore holes or ducts. This has the advantage that the filtration capacity can be considerably augmented and a high backwashing capacity is available.

It is advisable to provide a pressure control unit by which the through-flow capacity can be controlled.

It is therefore advantageous to construct the pressure control unit as a valve.

The valve can be a diaphragm valve or a ball valve.

Further, it is advantageous to provide a check valve.

It is especially advisable to combine the pressure control unit with a diaphragm valve.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 shows a variant of the filter element according to the invention;

FIG. 3 shows a section of a construction of a valve for the filter element according to the invention;

FIG. 4 shows another construction of a valve according to FIG. 3;

DESCRIPTION OF PREFERRED EMBODIMENTS

Figure 1:
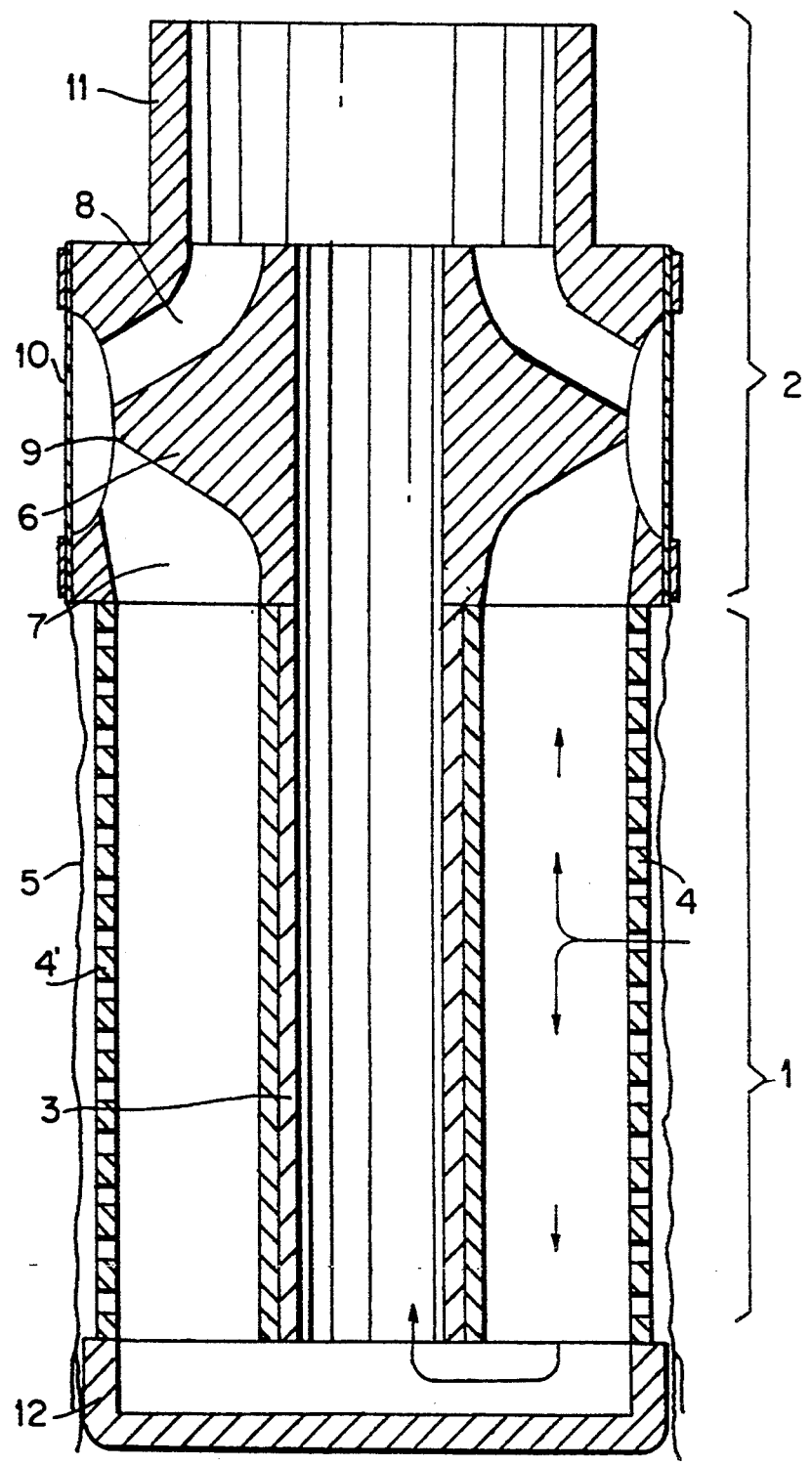
FIG. 1 shows a longitudinal section through the filter element according to the invention.

According to FIG. 1, the filter element includes a filtration part 1 and a head part 2. The filtration part 1 has a central tube 3 and perforated tubes arranged around the latter as supporting elements. The two perforated tubes 4, 4' are enclosed by a woven fabric 5 as filter medium, which is fastened in a known manner. The head part 2 includes a plate 6 which is provided with a bore hole 7 and a bore hole 8 as well as a seat 9. The bore holes 7 and 8 can be closed by an inflatable diaphragm 10 in the seat 9. The diaphragm 10 is constructed as part of a diaphragm valve. The upper part 11 of the head 2 forms a flange used for fastening the entire filter element. The lower portion of the filter element is closed by a base plate 12 with a central opening.

FIG. 2 shows a variant of the head part 2. A plate 6' is provided with a lower bore hole 7' and an upper bore hole 8' as well as a seat 9'. A ball 13 is provided in the seat 9' for closing the latter 9' and functions as a part of a ball valve.

FIG. 3 shows the left-hand portion of the head 2 of FIG. 1. In this instance, the plate 6 has a lateral wall 14 located radially outwardly, and the valve is constructed as a double-diaphragm valve.

FIG. 4 shows a variant according to FIG. 1, but with only one supporting element.

When operating the filter element, the filter element according to the invention is provided in a pressure vessel during the filtration phase and is completely submerged in a liquid to be filtered. The difference in pressure between the inside and outside of the filter element causes the filtrate to flow through the filter medium 5, upon which a filter cake of solid materials is deposited. The filtrate is now able to flow down through the tubes 4, 4' into the central tube 3 and escape in the head part 2 via the pressure controlled valve. The filtration direction is indicated by arrows.

After filtration, a backwashing agent which can be gas or liquid is fed into the filter element opposite the filtration direction over the entire cross section of the head 2. When the valve is closed, the backwashing agent presses down through the central tube 3 and through the filter element 5 from the inside to the outside via the tubes 4, 4'. If necessary, the amount of backwashing agent can be radically increased by opening the valve in the head part 2. In this case it is possible to act directly on the pipes 4, 4' and accordingly to supply any desired amount of backwashing agent to the woven fabric.

The advantage of the filter candle according to the invention consists in that an individual filter element can be operated in a controlled manner and with high throughflow capacity and low resistance through all tubes, through the central tube and the supporting tubes. A filter cake is only dried via the central tube by back-blowing, e.g. by means of a drying gas, so that the filter candle can be completely emptied. For dry discharging, the central tube and supporting tubes can be back-blown with high throughflow capacity and small resistance. Flow through the tubes can be controlled in a known manner by check valves while taking into account the pressure and flow ratios prevailing in the pressure vessel.

It will be understood that each of the elements described above, or two or more together, may also find a useful application in other types of constructions and methods differing from the types described above.

While the invention has been illustrated and described as embodied in a back-washable filter element, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A back-washable filter element for installing in a pressure vessel, comprising a lower supporting body including a central tube with a closed peripheral wall and a plurality of perforated tubes surrounding said central tube; and an upper head part having a lower opening which opens toward said perforated tubes, an upper opening, and a pressure control device located between said upper and lower openings and formed as a valve arranged to control flow between said perforated tubes and said head part.

2. A back-washable filter element as defined in claim 1, wherein said head part has a seat located between said upper and lower openings and receiving said pressure control device.

3. A back-washable filter element as defined in claim 1, wherein said perforated tubes have a plurality of perforations including upper perforations located close to said head part, said lower opening of said head part facing said upper perforations of said tubes.

4. A back-washable filter element as defined in claim 1, wherein said valve which forms said pressure control device is provided with a valve member formed as a diaphragm.

5. A back-washable filter element as defined in claim 1, wherein said valve which forms said pressure control device is provided with a valve member formed as a ball.

6. A back-washable filter element as defined in claim 1, wherein said valve which forms said pressure control device is formed as a check valve.

7. A back-washable filter element for installing in a pressure vessel, comprising a lower supporting body including a central tube with a closed peripheral wall and a plurality of perforated tubes surrounding said central tube; and an upper head part aligned along an axis and having a lower opening which opens toward said perforated tubes, an upper opening, and a pressure control device located between said upper and lower openings, said upper opening of said head part being formed as a borehole which extends axially and radially outwardly and said lower opening is formed as a borehole which extends axially and radially inwardly so that a seat is formed between said boreholes, said control device including a controlling element located in the region of said seat and cooperating with said seat to control the throughflow of fluid through the filter element.

* * * * *